3,187,020
PROCESS FOR PREPARING DIAZIDES
Francesco Minisci, Milan, and Remo Galli, Torricella del Pizzo, Cremona, Italy, assignors to Montecatini Società Generale per l'Industria Mineraria e Chimica, Milan, Italy
No Drawing. Filed Mar. 11, 1963, Ser. No. 264,056
Claims priority, application Italy, Mar. 13, 1962, 5,043/62
16 Claims. (Cl. 260—349)

Our invention relates to and has as an object a new process for preparing diazides. We do this by reacting an alkaline azide with an olefin in the presence of a ferrous salt and hydrogen peroxide or of an hydroperoxide according to the reaction:

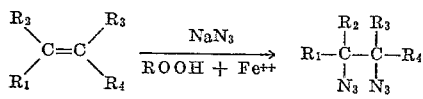

(wherein $R_1$, $R_2$, $R_3$ and $R_4$ represent hydrogen, a hydrocarbon or an aryl group).

According to our invention, the process may be carried out, either in a two-phase aqueous solution, e.g. the olefin used is slightly soluble in water, or in a single-phase organic solution using a solvent such as an alcohol or acetone. The sequence of reactant introduction is not critical and may be any of:

(a) The olefin, the alkaline azide, the solvent and the ferrous salt are mixed together and the hydrogen peroxide added thereafter, under cooling, since the reaction is exothermic;

(b) The ferrous salt is added to the mixture containing the olefin, the alkaline azide, the hydrogen peroxide and the solvent, or (c) The solvent, the olefin and the azide are mixed together and the hydrogen peroxide and the ferrous salt are introduced in the mixture.

We prefer alternative (c) which gives the best results. The reaction is preferably carried out in the presence of a ferric salt in addition to the ferrous salt so that $Fe^{+++}$ is present to initiate the reaction. $Fe^{++}$ in the presence of the peroxide converts to $Fe^{+++}$.

The hydrogen peroxide of our invention can be substituted by a hydroperoxide, such as t-butyl hydroperoxide. Hydrogen peroxide, however, is preferred as higher yields are obtained. The reaction occurs at temperatures ranging between —10° and +30° C. The reaction occurs immediately. The rapidity of reactant addition depends on maintaining a low temperature, that is, the rate of addition must not be such that the desired temperature is exceeded.

The process preferably uses an excess of hydrogen peroxide and of ferrous salt (3–4 moles of each per mole of azide). The amount of olefin with respect to the azide depends on the olefin cost. An olefin excess is employed when the cost thereof is low compared to the cost of the azide, and vice versa.

In consideration of the very general character of this reaction and in view of the very large number of existing olefins, this reaction is suitable for preparing a number of useful intermediates to obtain interesting derivatives such as: diamines by reduction of the diazides; heterocyclic compounds (for instance triazoles, tetra-azoles) by condensation with unsaturated compounds. These compounds can also be used as starting materials of organic compounds listed on pages 758–764 of volume XV of Grignard, Treatise of Organic Chemistry (1948).

The examples which are hereinafter reported, are to illustrate, but not to restrict the scope of, the present invention.

*Example 1*

25 grams hexene-1, 20 g. sodium azide and 10 g. ferric sulfate are mixed with 300 cc. methanol. The mixture is cooled to —5° C. and 57 g. hydrogen peroxide of 130 volumes and 165 g. heptahydrate ferrous sulfate are separately added at the same time while stirring. The addition lasts 15 minutes. Temperature during the addition is kept between —5° and +3° C. The reaction mixture is then diluted with water and extracted with petroleum ether. After evaporation of unreacted hexene and of the solvent, 13.6 g. of 1,2-diazide-n.hexane are left as residue. This, when hydrogenated catalytically on Raney nickel, yields 1,2-diaminohexane, B.P. 74–75° C./12 mm.; the diacetyl derivative of the diaminohexane shows M.P. 151° C.

*Example 2*

170 grams hetaphydrate ferrous sulfate and 58 g. hydrogen peroxide of 130 volumes are added simultaneously, under stirring and cooling, to a mixture of 25 g. cyclohexene, 10 g. ferric sulfate and 35 g. sodium azide in 200 cc. methanol. The reaction temperature is in the range between —5° and +5° C. After the addition is completed, the reaction mixture is diluted with water and then extracted with petroleum ether. After solvent evaporation, the unreacted cyclohexene is distilled off. 25 g. raw diazide are left as residue, which decomposes violently by heating. Through catalytic hydrogenation on Raney nickel, the 1,2-diaminocyclohexane is obtained, whose diacetyl derivatives melts at 270–271° C.

*Example 3*

52 g. hydrogen peroxide of 130 volumes are added under cooling and strong stirring to a mixture of 20 g. styrene, 40 g. sodium azide, 100 g. heptahydrate ferrous sulfate, 100 cc. acetone and 100 cc. water. The temperature is kept between —5° and 0° C. After the addition is completed, the mixture is again brought to room temperature, is diluted with water and extracted with petroleum ether. After evaporation of the solvent and of the unreacted styrene, the residue is distilled under vacuum while collecting the diazide at 112° C./1.5 mm.; found N: 45%, calculated: 44.6%. The diazide is hydrogenated on Raney nickel to the corresponding diamine, which boils at 93–94° C./0.65 mm. The dibenzoyl derivative melts at 225+226° C.; found N: 8.1%, calculated: 8.1%. The picrate melts at 169–170° C.; found N: 18.5%, calculated: 18.8%.

*Example 4*

34 g. t-butyl hydroperoxide and 160 g. heptahydrate ferrous sulfate are added simultaneously under stirring and cooling to a mixture of 40 g. styrene, 5 g. ferric sulfate, 60 g. sodium azide, 150 cc. acetone and 150 cc. water. Temperature is from —3° to 0° C. The mixture is diluted with water, extracted with petroleum ether and the residue is distilled under vacuum. After distilling the unreacted styrene, 20 g. of a product are collected, at 126–129° C./2 mm., which contains 58% of the diazide $C_6H_5$—$CH(N_3)$—$CH_2(N_3)$ and 42% of the azidoether $C_6H_5$—$CH(N_3)$—$CH_2$—$OC(CH_3)_3$.

*Example 5*

200 g. heptahydrate ferrous sulfate and 72 g. hydrogen peroxide of 130 volumes are added at —5° C. under stirring to a mixture of 25 g. cyclopentadiene, 10 g. ferric sulfate, 50 g. sodium azide and 200 cc. methyl alcohol. Addition of the first two reactants is to be made separately but within the same period of time. The reaction takes place immediately. After the addition is completed, the reaction mixture is diluted with water and extracted with petroleum ether. After solvent evaporation, 30.5 g. raw diazide are left as residue, which explodes upon heating.

Catalytic hydrogenation on Raney nickel leads to diaminocyclopentane, whose dibenzoyl derivative melts at 285° C.; found N: 9.1%, calculated: 9.1%.

Example 6

260 g. heptahydrate ferrous sulfate and 90 cc. hydrogen peroxide of 130 volumes are added, separately but within the same period of time, under stirring and cooling, to a mixture of 25 g. butadiene, 10 g. ferric sulfate, 50 g. sodium azide and 200 cc. methanol. The reaction temperature is −10° C. The reaction mixture is then diluted with water and extracted with petroleum ether. 20.5 g. raw diazide are so obtained, which decomposes violently upon heating. Catalytic hydrogenation on Raney nickel proves that the product consists of a mixture of 3,4-diazido-1-butene and 1,4-diazido-2-butene, and yields the 1,2-diaminobutane (dibenzoyl derivative M.P. 186° C.; found N: 9.6%, calculated: 9.5%) and the 1,4-diaminobutane (dibenzoyl derivative M.P. 179° C.; found N: 9.4%, calculated: 9.4%).

Obviously many modifications and variations of the present invention are possible in the light of the above teachings. It is therefore to be understood that within the scope of the appended claims, the invention may be practiced otherwise than as specifically described.

We claim:

1. A process for preparing a hydrocarbon diazide, which comprises reacting an olefinic hydrocarbon selected from the group consisting of monoolefinic hydrocarbons of from two to ten carbon atoms and conjugated diolefinic hydrocarbons of from four to ten carbon atoms with an azide of an alkali metal in the presence of a ferrous salt and a peroxide selected from the group consisting of hydrogen peroxide and hydroperoxide.

2. A process for preparing a hydrocarbon diazide, which comprises reacting an olefinic hydrocarbon selected from the group consisting of monoolefinic hydrocarbons of from two to ten carbon atoms and conjugated diolefinic hydrocarbons of from four to ten carbon atoms with an azide of an alkali metal in the presence of a ferrous salt, a ferric salt and a peroxide selected from the group consisting of hydrogen peroxide and hydroperoxide.

3. A process for preparing a hydrocarbon diazide, which comprises reacting an olefinic hydrocarbon selected from the group consisting of monoolefinic hydrocarbons of from two to ten carbon atoms and conjugated diolefinic hydrocarbons of from four to ten carbon atoms with an azide of an alkali metal in the presence of a ferrous salt and a peroxide selected from the group consisting of hydrogen peroxide and hydroperoxide at a temperature between −10° C. and +30° C. in a solvent selected from the group consisting of water, an organic solvent and mixtures thereof.

4. The process of claim 1, wherein heptahydrate ferrous sulfate is the ferrous salt.

5. The process according to claim 2, wherein ferric sulfate is ferric salt.

6. The process of claim 1, wherein sodium azide is the azide of an alkali metal employed.

7. The process of preparing 1,2-diazido-n.hexane, which comprises reacting hexane-1 wtih alkaline azide in the presence of a ferrous salt, a ferric salt and a peroxide selected from the group consisting of hydrogen peroxide and hydroperoxide at a temperature between −10° and +30° C.

8. The process of preparing 1,2-diazido-cyclohexane, which comprises reacting cyclohexane with alkaline azide in the presence of a ferrous salt, a ferric salt and a peroxide selected from the group consisting of hydrogen peroxide and hydroperoxide at a temperature between −10° and +30° C.

9. The process of preparing the diazide of ethyl-benzene, which comprises reacting styrene with alkaline azide in the presence of a ferrous salt, a ferric salt and a peroxide selected from the group consisting of hydrogen peroxide and hydroperoxide at a temperature between −10° and +30° C.

10. The process of preparing the 1,4-diazide of cyclopentadiene, which comprises reacting cyclopentadiene with alkaline azide in the presence of a ferrous salt, a ferric salt and a peroxide selected from the group consisting of hydrogen peroxide and hydroperoxide at a temperature between −10° and +30° C.

11. The process of preparing the 3,4-diazido-1-butene and 1,4-diazido-2-butene, which comprises reacting butadiene with alkaline azide in the presence of a ferrous salt, a ferric salt and a peroxide selected from the group consisting of hydrogen peroxide and hydroperoxide at a temperature between −10° and +30° C.

12. The process of preparing 1,2-diazido-n.hexane, which comprises reacting hexane-1 with sodium azide in the presence of heptahydrate ferrous sulfate, ferric sulfate and a peroxide selected from the group consisting of hydrogen peroxide and hydroperoxide at a temperature between −10° and +30° C.

13. The process of preparing 1,2-diazido-cyclo-hexane, which comprises reacting cyclohexane with sodium azide in the presence of heptahydrate ferrous sulfate, ferric sulfate and a peroxide selected from the group consisting of hydrogen peroxide and hydroperoxide at a temperature between −10° and +30° C.

14. The process of preparing the diazide of ethylbenzene, which comprises reacting styrene with sodium azide in the presence of heptahydrate ferrous sulfate, ferric sulfate and a peroxide selected from the group consisting of hydrogen peroxide and hydroperoxide at a temperature between −10° and +30° C.

15. The process of preparing the 1,4-diazide of cyclopentadiene, which comprises reacting cyclopentadiene with sodium azide in the presence of heptahydrate ferrous sulfate, ferric sulfate and a peroxide selected from the group consisting of hydrogen peroxide and hydroperoxide at a temperature between −10° and +30° C.

16. The process of preparing the 3,4-diazido-1-butene and 1,4-diazido-2-butene, which comprises reacting butadiene with sodium azide in the presence of heptahydrate ferrous sulfate, ferric sulfate and a peroxide selected from the group consisting of hydrogen peroxide and hydroperoxide at a temperature between −10° and +30° C.

References Cited in the file of this patent

UNITED STATES PATENTS 2,557,924 Schaad _____ June 26, 1951
3,026,334 Minisci _____ Mar. 20, 1962

IRVING MARCUS, *Primary Examiner.*

JOHN D. RANDOLPH, WALTER A. MODANCE,
*Examiners.*